July 2, 1940.   R. SCHARFNAGEL   2,206,516

ELECTRON TUBE

Filed May 5, 1938

Inventor:
Rudolf Scharfnagel
by
Attorney

Patented July 2, 1940

2,206,516

UNITED STATES PATENT OFFICE 2,206,516

ELECTRON TUBE

Rudolf Scharfnagel, Stuttgart, Germany, assignor to C. Lorenz Aktiengesellschaft, Berlin-Tempelhof, Lorenzweg, Germany, a company Application May 5, 1938, Serial No. 206,138
In Germany May 5, 1937

3 Claims. (Cl. 250—27.5)

The invention relates to electron tubes of the kind in which the electrode system is held in place by an assembly which comprises a ceramic body and a glass coating or seal applied to this body.

After the application of such seal, that is, while the ceramic body and the seal thereon are cooling down, difficulties arise through strains which make the glass seal very sensitive to temperature changes. In many cases cracks form during the cooling of the assembly.

Figure 1:
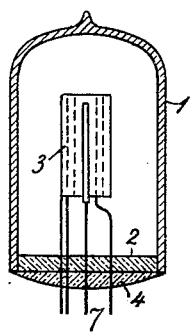
Figure 2:
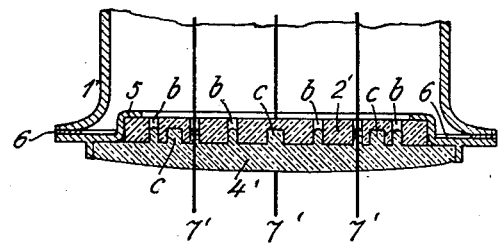

The invention has for its object to avoid the formation of these cracks and consists in certain features of novelty which will appear from the following description and be particularly pointed out in the appended claims, reference being had to the accompanying drawing in which Fig. 1 is a partially diagrammatic sectional view of an electron tube embodying the invention; Fig. 2, drawn to a larger scale than Fig. 1, is a fragmentary sectional view showing a modification of the device represented in Fig. 1.

In the devices here shown by way of example, the bulb of the electron tube is designated 1 while 2 denotes a ceramic disc provided with a glass seal 4. The electrode system 3 is shown in Fig. 1 only. The supply wires or leads 7 thereof are arranged to extend through disc 2 and are secured therein by seal 4.

In the arrangement according to Fig. 1 the seal 4 is used also for holding the parts 1, 2 together by sealing the joint thereof.

As shown in Fig. 2, disc 2' may have bores $b$ and recesses $c$ in order to form with the seal 4' a firmly interlocked structure. Such bores or recesses may be dispensed with if the porousness of the ceramic material is sufficient for the sealing material 4 to penetrate. Fig. 2 also shows that the disc 2' may be united at its edge with a metal ring 5 by seal 4', ring 5 being fastened to the bulb 1' by means of glass seal 6 or the like.

Bulb 1 may be of a metal or of a metal-ceramic material or may be of glass.

As is well known, the danger of strains arising in seal 4 is much decreased if the parts 2, 4 are of similar coefficients of expansion. However, even if the curves customarily used to illustrate the expansion of disc 2 and that of the seal 4 well accord with each other, in case of an unequal distribution of temperatures, during rapid cooling, coefficients of expansion may result which are to such extent different from each other that strains arise in the seal 4 which will cause cracks to form therein.

In accordance with the invention, for the disc 2 is made of ceramic materials whose coefficient of expansion is below some such value as $48 \cdot 10^{-7}$.

Materials of this kind are well known per se and have been tried in assemblies of glass and ceramic material, where the parts to be interconnected had the same coefficients of expansion.

By employing a disc 2 made of a ceramic material whose coefficient of expansion is below the value $48 \cdot 10^{-7}$, the sealing may be accomplished by pouring liquid glass on disc 2 or by arranging solid glass thereon and then liquefying this glass by heating the entire electron tube in a furnace.

If disc 2 was made of a ceramic material of a high coefficient of expansion, then cracks would occur in the seal 4.

Preferably, the glass used for producing the seal 4 should have a cofficient of expansion less than $53 \cdot 10^{-7}$. Also it will be of advantage to employ a glass softening at temperatures of 380 or 400 degrees Centigrade or temperatures still lower than these.

Electron tubes as provided by the invention are much less sensitive than those in which disc 2 has a high coefficient of expansion.

Ring 5 may be of a pure metal, as tungsten or molybdenum, or may be made of suitable alloys the use of which is desirable on account of their adaptability in connection with glass.

What is claimed is:

1. An electron tube comprising a bulb, a cover of porous ceramic material having numerous bores therein which are large compared with the size of the pores in said ceramic material, said material having a coefficient of expansion below the value $48 \cdot 10^{-7}$, an electrode system within said bulb supported by said cover and sealing material coating said cover and filling said bores.

2. An electron tube according to claim 1 wherein said sealing material is of glass having a coefficient of expansion of less than $53 \cdot 10^{-7}$.

3. An electron tube according to claim 1 wherein said sealing material is of a glass softening at temperatures below 400° Centigrade.

RUDOLF SCHARFNAGEL.